US012067821B2

(12) United States Patent

Eller et al.

(10) Patent No.: US 12,067,821 B2

(45) Date of Patent: Aug. 20, 2024

(54) EXIT DEVICE WITH INDICATOR

(71) Applicant: ASSA ABLOY Access and Egress Hardware Group, Inc., New Haven, CT (US)

(72) Inventors: Darren C. Eller, Madison, CT (US); Andrew S. Geraci, Durham, CT (US)

(73) Assignee: ASSA ABLOY Access and Egress Hardware Group, Inc., New Haven, CT (US)

( * ) Notice: Subject to any disclaimer, the term of this patent is extended or adjusted under 35 U.S.C. 154(b) by 342 days.

(21) Appl. No.: 17/478,140

(22) Filed: Sep. 17, 2021

(65) Prior Publication Data

US 2022/0139140 A1 May 5, 2022

Related U.S. Application Data

(60) Provisional application No. 63/110,097, filed on Nov. 5, 2020.

(51) Int. Cl.
*G07C 9/00* (2020.01)
*E05B 65/10* (2006.01)

(52) U.S. Cl.
CPC ..... *G07C 9/00896* (2013.01); *G07C 9/00563* (2013.01); *E05B 65/1053* (2013.01); *E05B 65/1093* (2013.01)

(58) Field of Classification Search
CPC ...... E05B 65/00; E05B 65/10; E05B 65/1046; E05B 65/1053; E05B 65/1093; G07C 9/00; G07C 9/00896; G07C 9/00904; G07C 9/00912; G07C 9/00563
USPC ........................................................ 70/278.7
See application file for complete search history.

(56) References Cited

U.S. PATENT DOCUMENTS

| | | | | |
|---|---|---|---|---|
| 5,252,798 A * | 10/1993 | Kamada | ............... | H01H 13/023 200/312 |
| 2018/0245374 A1* | 8/2018 | Arlinghaus | ......... | E05B 47/0001 |
| 2018/0245375 A1* | 8/2018 | Arlinghaus | ......... | E05B 47/0001 |

FOREIGN PATENT DOCUMENTS

| | | | |
|---|---|---|---|
| CA | 3093814 | 10/2019 | |
| CN | 103993791 A * | 8/2014 | ............. E05B 17/10 |
| KR | 20110054570 A * | 5/2011 | |

* cited by examiner

*Primary Examiner* — Nathan Cumar

(74) *Attorney, Agent, or Firm* — Wolf, Greenfield & Sacks, P.C.

(57) ABSTRACT

A door exit device may include a light source for indicating a status of the exit device. The light source may be capable of providing a first indication denoting that the exit device is in a first state (e.g., a dogged state) and a second indication denoting that the exit device is in a second state (e.g., an undogged state). Further, the exit device may include first and second parallel control systems capable of electronically controlling that status of the exit device. In some instances, a first parallel control system may supersede a second parallel control system.

15 Claims, 4 Drawing Sheets

EXIT DEVICE WITH INDICATOR

CROSS-REFERENCE TO RELATED APPLICATIONS

This Application claims the benefit under 35 U.S.C. § 119(e) of U.S. Provisional Application Ser. No. 63/110,097, titled "EXIT DEVICE WITH INDICATOR," filed on Nov. 5, 2020, which is incorporated by reference herein in its entirety.

FIELD

Disclosed embodiments relate to exit device having an indicator, for example, to indicate whether the exit device is in a dogged or undogged state.

BACKGROUND

Conventional exit devices typically employ a dogging mechanism which may be used to prevent an actuator (e.g., a latch) from engaging an associated door strike. These dogging mechanisms are typically used in a wide variety of applications including in commercial buildings or schools, where it may be desirable to keep doors open for both push and pull without actuation of an actuator (e.g., a latch).

BRIEF SUMMARY

According to one aspect, a door exit device includes a latch, an electronic dogging mechanism, and a switch. The latch may be configured to move between an extended position and a retracted position. Further, the electronic dogging mechanism may be configured to selectively hold the latch in the retracted position when the dogging mechanism is in a dogged state and allow the latch to move between the retracted and extended positions when the dogging mechanism is in an undogged state. Also, the switch may have a light source therein such that the switch is configured to transition the electronic dogging mechanism from the dogged state to the undogged state and may be configured to provide a first indication denoting the dogged state and a second indication denoting that the undogged state.

According to another aspect, a door exit device includes a latch, an electronic dogging mechanism, and a light source. The latch may be configured to move between an extended position and a retracted position. Further, the electronic dogging mechanism may be configured to selectively hold the latch in the retracted position when the dogging mechanism is in a dogged state and allow the latch to move between the retracted and extended positions when the dogging mechanism is in an undogged state. Also, the light source may provide a first indication denoting the dogged state and a second indication denoting that the undogged state.

According to another aspect, a door exit device includes a latch, an electronic dogging mechanism, a switch, and a light source. The latch may be configured to move between an extended position and a retracted position. Further, the electronic dogging mechanism may be configured to selectively hold the latch in the retracted position when the dogging mechanism is in a dogged state and allow the latch to move between the retracted and extended positions when the dogging mechanism is in an undogged state. Also, the switch may be configured to send a first command to the electronic dogging mechanism, such that the command controls the electronic dogging mechanism. The light source may provide a first indication denoting the dogged state and a second indication denoting the undogged state, wherein the light source is disposed within or formed with the switch. The electronic dogging mechanism may be further configured to receive a second command, wherein the second command controls the electronic dogging mechanism. In some instances, the first command may supersede the second command.

According to another aspect, a method of operating a door exit device includes: (1) receiving a first command from a first control system, wherein the first command is a dogging command, (2) receiving a second command from a second control system, wherein the second command is an undogging command, (3) in response to receiving both the first and second commands, undogging the door exit device according to only the second command, (4) and providing a first indication denoting that the door exit device is undogged.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
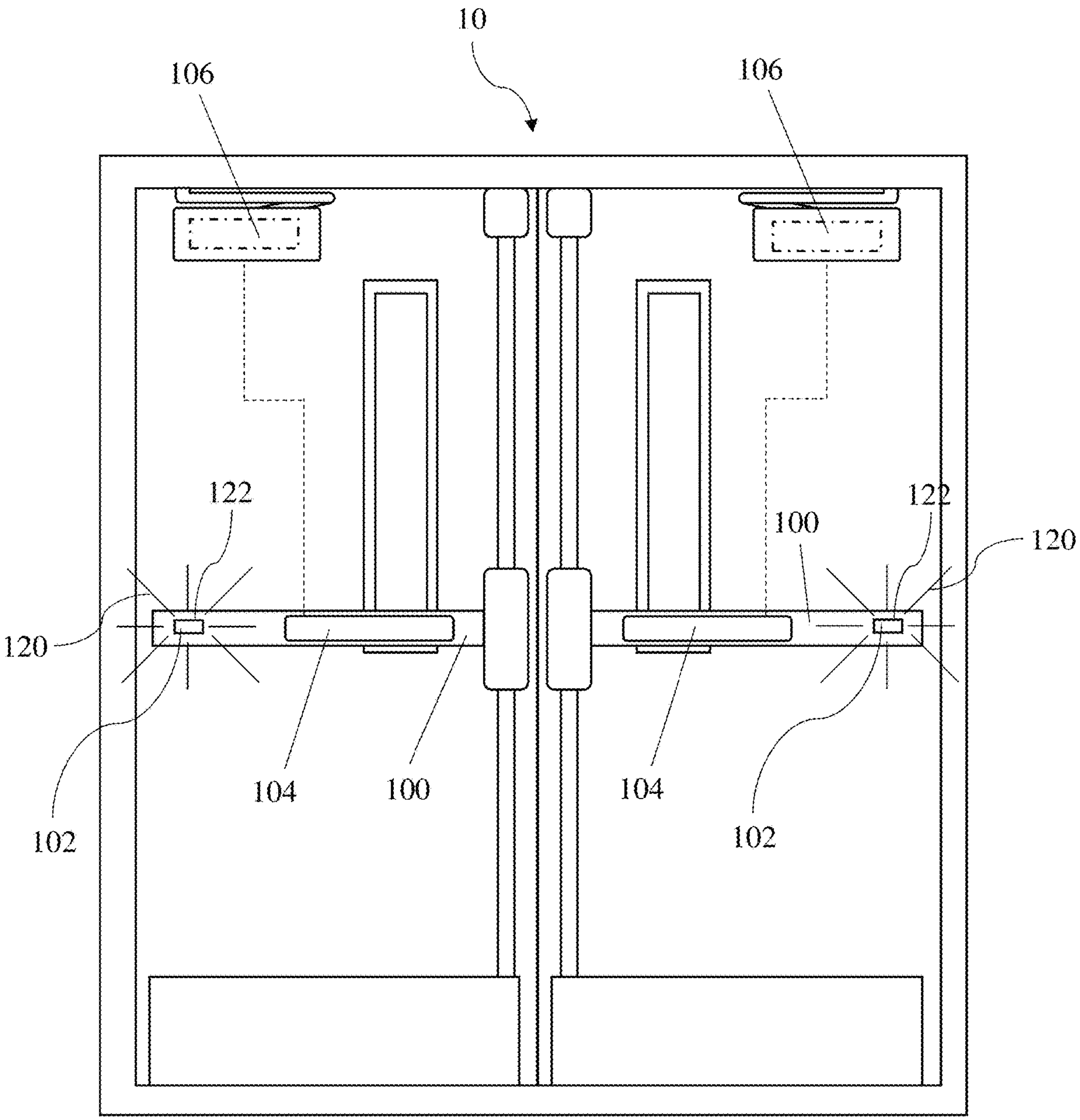
FIG. 1 is a front view of a door system equipped with an exit device having an indicator according to one illustrative embodiment.

In many instances, an exit device may include a dogging mechanism constructed to retain a latch or other mechanical retainer of the exit device in either an undogged state or a dogged state. That is, conventional dogging mechanisms generally hold a push bar of an exit device in a retracted position against a force that may serve to bias the push bar towards an extended position. For example, a conventional dogging mechanism may precisely catch and hold the push bar in a particular arrangement where the latch is disengaged. Alternatively or additionally, a conventional dogging mechanism may be electronically controlled. For example, a dogging mechanism may include an electronic dogging mechanism or other suitable electronic actuator to transition the exit device between the dogged and undogged states.

In some instances, it may be desirable for an exit device equipped with a dogging mechanism to provide an indication of the state of the exit device (e.g., dogged or undogged). Particularly, this may be important in a classroom setting where a teacher may desire to quickly see that that an exit device is in a locked state. The exit device having an indicator may be configured such that the dogging status of the exit device is automatically indicated as the exit device is transitioned from the dogged state to the undogged state or from the undogged state to the dogged state. Particularly, in the event of an emergency situation (e.g., an active intruder situation), a teacher may wish to quickly see whether the exit device is in a dogged state or undogged state. In such emergency situations, a school may have procedures in place to maximize the safety of its occupants. For example, the school may require that the teachers place an exit device for a classroom in an undogged state and turn off the lights in the room. However, some conventional status indicators may not be visible to a teacher in low light conditions, particularly, if the teacher is positioned at a distance away from the exit device. Thus, in some instances a teacher may not be able to tell whether a conventional exit device is in a dogged or undogged state when following procedures associated with an emergency situation.

In view of the above, the Inventors have recognized the advantages of an exit device having a status indicator capable of providing an indication of the status (e.g., dogged or undogged) of the exit device, wherein the indication is clearly discernable, even at a distance, or in low light conditions, or both. For example, an exit device according to the present disclosure may include a door exit device including a latch, an electronic dogging mechanism, and a light source to provide the functionality described above.

According to one aspect of the present disclosure, the latch is designed to selectively engage (e.g., transition between an engaged state and a disengaged state) with a catch or other suitable implement of the exit device such that the latch prevents a door of the exit device from opening when the latch is engaged with the catch (e.g., an engaged state). Conversely, the door of the exit device may be free to open when the latch is disengaged from the catch (e.g., a disengaged state). In some instances, in the engaged state, the latch may be extended to engage with the catch (e.g., the latch may be in an extended position). Relatedly, the latch may be retracted to disengage with the catch (e.g., the latch may be in a retracted position). During normal operation, a user may control the engagement of the latch with the catch by activating an actuator (e.g., pushing a push bar, turning a knob, pressing a button, or other suitable actuations means) such that the user may transition the latch between the engaged state and the disengaged state. In some instances, the actuator may be biased such that the actuator and the latch default to the engaged state when not operated by a user.

In some circumstances, however, it may be desirable to retain the exit device in the disengaged state to increase the ease of accessing the space beyond the exit device (e.g., for a classroom during school hours or for a storefront during business hours). Accordingly, the exit device may be equipped with a dogging mechanism. The dogging mechanism may serve to selectively hold the latch in the disengaged state (e.g., the retracted position), preventing the latch from engaging the catch, allowing access beyond the exit device. When the dogging mechanism is active, the exit device may be said to be in a dogged state. Relatedly, when such a dogging mechanism not active, the exit device may be said to be in an undogged state. The dogging mechanism may be electronic or mechanical, depending on the application.

For example, according to another aspect of the present disclosure, the exit device includes an electronic dogging mechanism. The electronic dogging mechanism may serve to transition the exit device between the undogged and dogged states. Specifically, according to exemplary embodiments described herein, an electronic dogging mechanism may include one or more processors configured to coordinate one or more functions of the electronic dogging mechanism. The processor(s) may be configured to execute one or more sets of computer-executable instructions stored on computer-readable storage onboard the electronic dogging mechanism. The storage may be implemented as one or more volatile and/or non-volatile storages, such as non-volatile memory. The processor(s) may be configured to receive information from one or more sensors and/or actuators (e.g., a switch) of the exit device, including signals from a magnetic encoder of the exit device. The processor(s) may also be configured to command one or more actuators of the electronic dogging mechanism. For example, the processor (s) may command an actuator (e.g., a motor) to automatically move a driveshaft of the electronic dogging mechanism, which may in turn move the latch as appropriate (e.g., from the retracted position to the extended position or from the extended position to the retracted position). The processor(s) may also be configured to communicate with one or more other devices. For example, the processor(s) may control one or more wireless transmitters of the electronic dogging mechanism to send or receive information/commands to or from a remote device, respectively. The exit device may further include a power source configured to supply electrical power to the processor(s) and associated components. In some embodiments, the power source is one or more batteries.

Alternatively or additionally, the exit device may include a mechanical dogging mechanism. For example, the exit device may include a mechanism for holding the actuator (e.g., the push bar) in actuated state (e.g., a depressed state in the case of a push bar). In some instances, the exit device may include a retainer or stopper that may be selectively positioned to continuously actuate the actuator such that the latch remains in the retracted position. Accordingly, a user may open the door associated with the exit device without actuating the actuator, setting the exit device to the dogged state until a user decouples the actuator from the retainer or otherwise selectively positions the retainer or stopper such that the retainer or stopper no longer holds the actuator such that the actuator is continuously actuated. Of course, other mechanical dogging mechanisms are also contemplated, depending on the application.

In either arrangement, the dogging mechanism may be electronically connected to an indicator, such as a light source. The light source may provide one or more indications, for example, indications related to a state of the exit device (e.g., dogged state or undogged state). Specifically, the light source may be capable of providing a first indication (e.g., an indication denoting that the electronic dogging mechanism is in a dogged state) and a second indication (e.g., an indication denoting that the electronic dogging mechanism is in an undogged). In the electronic arrangement, the light source may be electrically connected to the processor of the electronic dogging mechanism so that the light source may provide an appropriate indication based on data received from the processor of the electronic dogging mechanism. In the mechanical arrangement, the exit device may include a sensor configured to detect whether the exit device is in the dogged or undogged configuration. The sensor may then send a signal to the light source to provide an appropriate indication. For example, in some instances, the light source may be off in the dogged state and illuminated in the undogged state. Alternatively, the light source may emit solid light in the dogged state and flashing light in the undogged state. In some instances, the light source may emit light of a first color in the dogged state and light of a second color in the undogged state. Combinations of the above indications are also contemplated. Of course, the light source may provide any suitable indications, depending on the application. Further, the light source may be configured such that the indication provided by the light source is clearly visible and understandable at both a distance away from the exit device as well as in low light conditions. In some embodiments, the power source associated with the electronic dogging mechanism powers the light source, while in other embodiments, the light source contains a separate power source.

In some circumstances (e.g., the emergency circumstances described above), it may be desirable for a user (e.g., a teacher) to be able to quickly transition the exit device between states (e.g., from the dogged state to the undogged state) while also receiving immediate and clear feedback that the transition is complete. For example, in some instances, the exit device may include a switch electrically connected to the dogging mechanism (e.g., via the processor in the case of the electronic dogging mechanism). The switch may be capable of quickly transitioning the exit device between states once the switch is actuated (e.g., by a user). In some instances, the switch may be one-directional (e.g., capable of transitioning the exit device from the dogged state to the undogged state only or from the undogged state to the dogged state only), while in other instances, the switch may be two-directional (e.g., capable of transitioning the exit device both from the dogged state to the undogged state and from the undogged state tot the dogged state). Thus, the switch may form a part of a primary control system for operating the dogging mechanism. In some instances, the light source may be disposed within or formed with the switch. In such instances, the switch may be transparent.

Alternatively or in addition, the exit device may be equipped with a secondary control system such as a user authentication module. An exit device with an embedded user authentication module may enable a user on the interior side of a door to control the state of the exit device quickly and easily. For example, a user on the interior side of the door may lock the exit device with a card held in the vicinity of a card reader that is embedded in the exit device. The user may be able to lock the exit device much more quickly with a card and card reader arrangement than with a conventional key and lock cylinder arrangement. Additionally, the user may be able to quickly and easily change the state of the exit device mounted on the interior side of the door. The exit device could be set to the dogged state the undogged state, or any other suitable state (e.g., a dog-on-next exit state in which the door is moved into a dogged state after the next instance of a user exiting through the door). Furthermore, an exit device with an embedded user authentication module may enable a user on the interior side of a door to simultaneously change the states of both the exterior trim and the exit device, enabling different combinations of functions. The user authentication module may be capable of communicating directly with the electronic dogging mechanism (e.g., via the processor) to perform the functionality described above.

However, in some circumstances (e.g., the emergency circumstances described above), it may be desirable for the switch to supersede the user authentication module when controlling the dogging mechanism. For example, a bad actor may come into possession of a card capable of controlling the user authentication module, and it may be desirable for a user (e.g., a teacher or shop owner) to override the functionality of the user authentication module via the switch. Thus, the processor of the electronic dogging mechanism may include logic preventing the user authentication module from altering the state of the exit device when the user enters a command via the switch. Using such logic, for example, the processor may prevent the electronic dogging mechanism from transitioning the exit device from the undogged state to the dogged state in response to a signal from the user authentication module when the user has manually restricted the exit device to the undogged state using the switch. Of course, other control logic and functionality is also contemplated, depending on the application.

The light source may also be sensitive to instances where the processor prevents the user authentication module from altering the state of the exit device when the user enters a command via the switch. Thus, in such instances, the light source may provide a third indication (e.g., a long-short-long flashing light, a colored light, or other suitable indication) in response to the processor executing logic allowing the switch to supersede the user authentication module when controlling the dogging mechanism.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a front view of a door system 10 equipped with an exit device 100 according to one illustrative embodiment. Exit device 100 may be equipped with a push bar 104 and a light indicator 102, which includes a light source 118 (shown in FIG. 3) emitting light 120. Exit device 100 may serve to selectively prevent access beyond door system 10. For example, exit device 100 may default to a closed state wherein door system 10 remains unopenable until a user actuates exit device 100 to transition exit device 100 to an open state, for example, via a suitable actuator such as push bar 104. Specifically, a user may push on push bar 104 to transition exit device 100 into the open state, allowing the user to open a door of door system 10 to access an area beyond door system 10. After a user releases push bar 104, exit device 100 may then once again default to the closed state. This state of operation of exit device 100 may be described as an undogged state. In addition to the above, exit device 100 may be capable of being held such that exit device 100 remains in the open state continuously. In such a state, a user may open door system 10 and move beyond door system 10 without actuating push bar 104. This state of operation of exit device 100 may be described as a dogged state. Alternatively or additionally, a user may be able to transition between the dogged and undogged states via a switch 122, as will be explained in greater detail below.

Light indicator 102 may be capable of indicating the state of exit device 100. For example, light indicator 102 may be capable of providing two (or more when appropriate) indications, each denoting a state of exit device 100. In some embodiments, light indicator 102 displays the first indication (e.g., via light 120) when exit device 100 is in the dogged state and the second indication when exit device 100 is in the undogged state. The first and second indications may take on any suitable form. For example, in some embodiments, the first indication may be a green light while the second indication is a red light. Alternatively or additionally, light indicator 102 may project light 120 in the first indication and not project light 120 in the second indication. In some instances, light indicator 102 may project light 120 in a solid pattern in the first indication and in a flashing pattern in the second indication. Of course, combinations of the above indications may be employed along with any other suitable indications, depending on the application.

Figure 3:
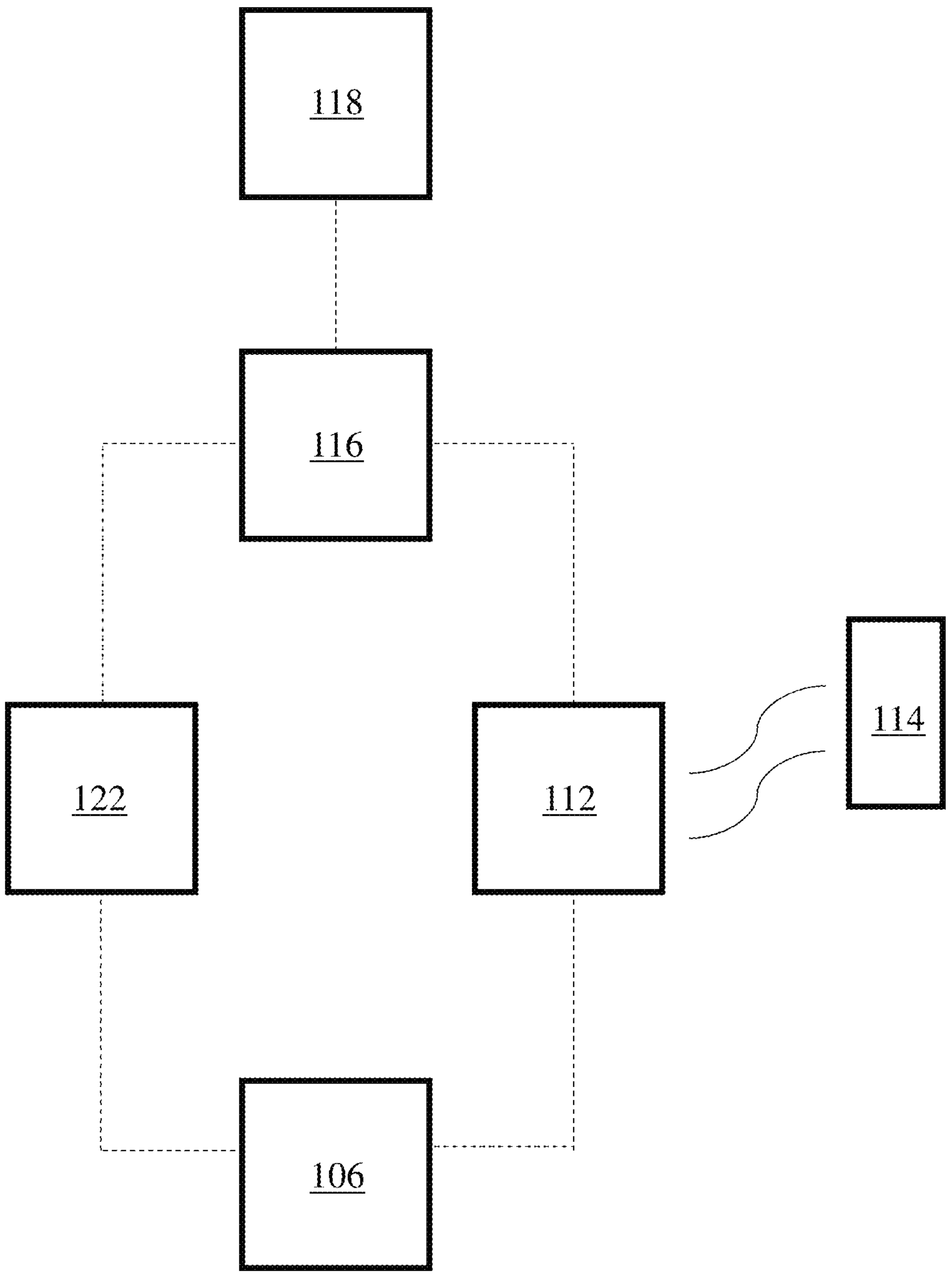
FIG. 3 is a schematic of an electronic control system of an exit device having an indicator according to one illustrative embodiment.

Light indicator 102 may project light 120 from a light source 118 (shown in FIG. 3). Light source 118 may be disposed within switch 122 or otherwise formed with switch 122. Thus, in some instances, switch 122 may be part of the same structure as light indicator 102, though this need not be the case. For example, light indicator 102 may be a separate structure from switch 122, depending on the application.

Light source 118 may take on any suitable form including an incandescent bulb, a halogen bulb, a fluorescent tube, a light emitting diode, a high intensity discharge bulb, or any other suitable type of light source.

Light indicator 102 and light source 118 may further be configured to project light 120 so as to provide first and second indications that are easily visible in low light conditions. For example, light source 118 may be capable of projecting light 120 such that light 120 is of sufficient intensity such that a user (e.g., a teacher or a shop owner) may be able to easily see and understand the indication in low or no light conditions (e.g., when ambient light is turned off during an emergency situation). Alternatively or additionally, light indicator 102 may be made of a sufficiently transparent or translucent material so as to allow light 120 to shine through a surface of light indicator 102 with minimal distortion. For example, if light source 118 is off (e.g., to denote the undogged state), the user may be able to quickly discern that the door is in the undogged state because light 120 will not be visible. Alternatively, in circumstances where light source 118 projects light 120 through light indicator 102, light 120 may be of sufficient intensity for the user to clearly see light 120, even with little or no ambient light (e.g., in the dark).

Moreover, light source 118 may be capable of projecting light 120 through light indicator 102 such that light 120 is visible from a sufficiently large distance. For example, light 120 may be visible from a distance of greater than or equal to 20 ft, greater than or equal to 25 ft, or greater than or equal to 30 ft. Additionally, light 120 may be visible from a distance of less than or equal to 50 ft, less than or equal to 45 ft, or less than or equal to 40 ft. Of course, combinations of the above-referenced ranges are also contemplated, including visibility distances of between 20 ft and 50 ft inclusive, between 25 ft and 45 feet inclusive, or between 30 ft and 40 ft inclusive. Of course, other visibility ranges are also possible, depending on the application.

Figure 2:
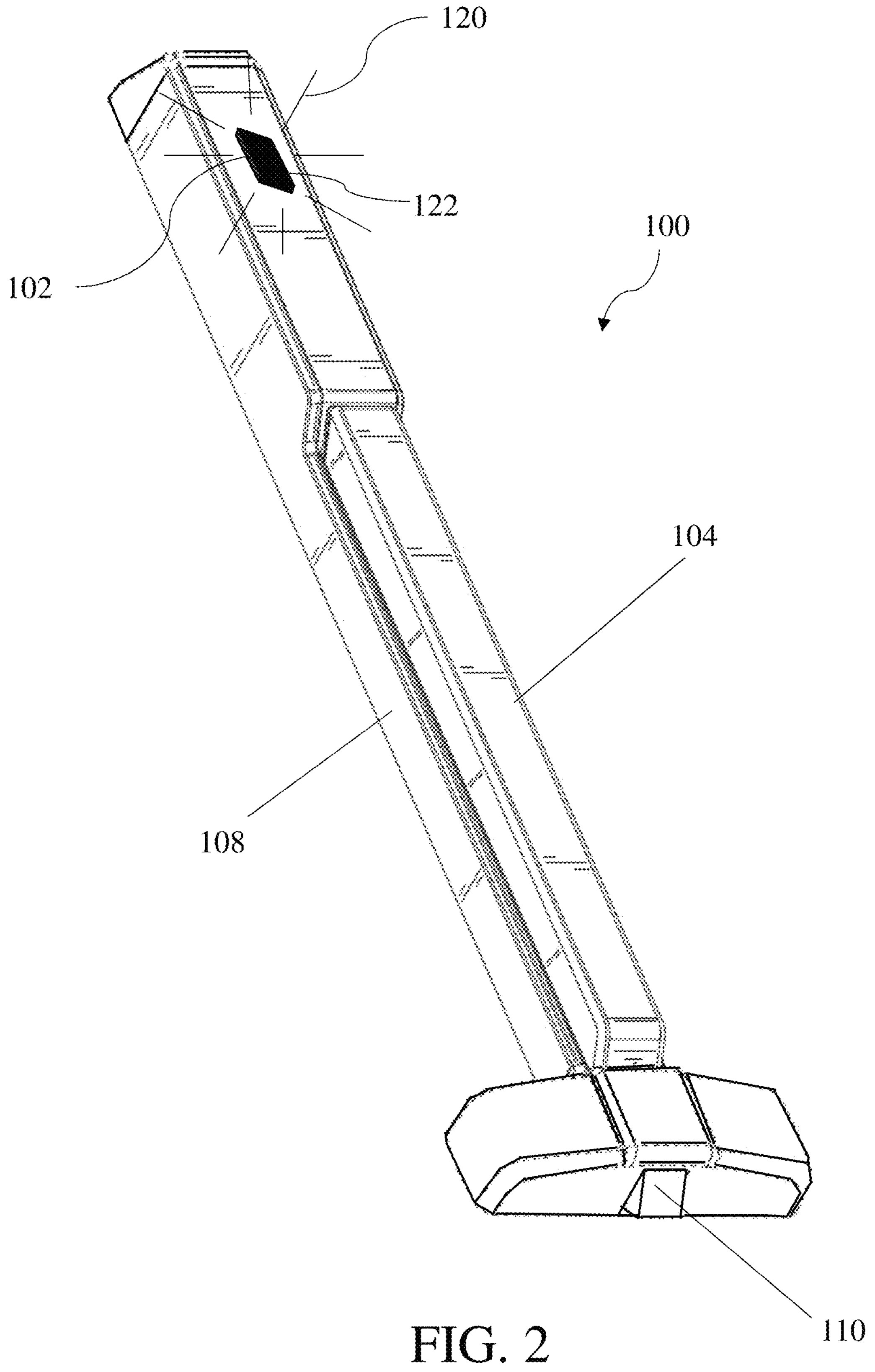
FIG. 2 is a perspective view of an exit device having an indicator according to one illustrative embodiment.

FIG. 2 is a perspective view of exit device 100, free of door system 10. In addition to the above, exit device 100 may include a latch 110. Latch 110 may be actuated by push bar 104. For example, by default, latch 110 may be in an extended position. A user may then press on push bar 104 in the direction of a body 108 of exit device 100, moving latch 110 to a retracted position (e.g., retracted within exit device 100). When latch 110 is in the extended position latch 110 may interface with a feature of door system 10, for example, a catch or opening disposed on door system 10 that is complementary to the shape of latch 110, preventing door system 10 from opening. Conversely, when latch 110 is retracted (e.g., by pushing push bar 104 in the direction of body 108), door system 100 may be opened, as latch 110 is no longer interfacing with the catch or opening disposed on door system 10.

Latch 110 may be biased towards the extended position by default. Such a configuration may correspond to the undogged state described above. Relatedly, latch 110 may be placed in a configuration where latch 110 is retained in the retracted position. Such a configuration may correspond to the dogged state described above. In some embodiments, exit device 100 may include an electronic dogging mechanism 116 (shown in FIG. 3) configured to selectively set latch 110 in the dogged and undogged states. Switch 122 may be capable of controlling electronic dogging mechanism 116. For example, switch 122 may be configured to set electronic dogging mechanism 116 in the dogged state only, set electronic dogging mechanism in the undogged state only, or selectively set electronic dogging mechanism 116 in either the dogged or the undogged states, depending on user input.

In some instances, as shown in FIG. 3, electronic dogging mechanism 116 may be controlled via parallel control systems. For example, electronic dogging mechanism 116 may be controlled by a user authentication module 112 (e.g., in addition to the control system defined by switch 122 described above). User authentication module 112 may be configured to receive a signal (e.g., an RFID signal or other suitable signal) from an external device, such as an access card 114. The signal may contain credentials of a user attempting to operate exit device 100. For example, upon access card 114 providing appropriate credentials to user authentication module 112, user authentication module 112 may direct electronic dogging mechanism 116 to transition exit device 100 from the undogged state to the dogged state (e.g., via latch 110). Thus, after providing credentials to user authentication module 112 via an access card 114, a user may pass beyond door system 10. Of course, this need not be the case, as the combination of access card 114 and user authentication module 112 may control electronic dogging mechanism 116 in any suitable manner.

The control system defined by user authentication module 112 and access card 114 may run parallel to the control system defined by switch 122 (which functions as described above). However, in some scenarios (e.g., emergency scenarios) it may be desirable for the control system defined by switch 122 to supersede the control system defined by user authentication module 112 (e.g., in scenarios where a bad actor obtains access card 114). Accordingly, the parallel control systems may be capable of sending instructions to a processor contained within electronic dogging mechanism 116, which may in some instances conflict. Thus, the processor may be capable of distinguishing between a signal sent from user authentication module 112 and a signal sent from switch 122 and prioritize the signals accordingly (e.g., prioritize the signal from switch 122 over the signal from user authentication module 112). Accordingly, the processor may be capable of resolving conflicts between instructions associated with the signal sent from switch 122 and the instructions associated with the signal sent from user authentication module 112 in favor if the instructions associated with the signal sent from switch 122. Of course, the processor may be capable of prioritizing the signals in any suitable manner, depending on the application.

In turn, electronic dogging mechanism 116 may be capable of sending a signal to light indicator 102 such that light indicator 102 activated light source 118 appropriately so as to provide an indication related to the status of exit device 100 as described above, based at least in part on the inputs from user authentication module 112 and/or switch 122 as appropriate. For example, in some instances, light indicator 102 may be capable of providing a third indication, denoting a conflict between the command associated with switch 122 and the command associated with user authentication module 112. Such an indication may further serve to assure the user that any such conflict is being resolved in favor of switch 122.

Light source 118, electronic dogging mechanism 116, switch 122, and user authentication module 112 may each be powered via a power source 106. As shown in FIG. 3, power source 106 may be connected in parallel to switch 122 and user authentication module 112. In turn, user authentication module 112 and switch 122 may provide power to electronic dogging mechanism 116, which may then in turn, provide power to light source 118. Of course, exit device 100 may include multiple power sources (e.g., one power source for each component). Of course, power source 106 may be electrically configured in any suitable manner, depending on the application.

In some embodiments, switch 122 is disposed on body 108 of exit device 100, though this need not be the case. For example, switch 122 may be disposed on push bar 104 or any other suitable surface, depending on the application. In some instances, switch 122 if formed with light indicator 102 (as shown in FIGS. 1-2), though this need not be the case, as in some instances, light indicator 102 and switch 122 are formed separately.

Figure 4:
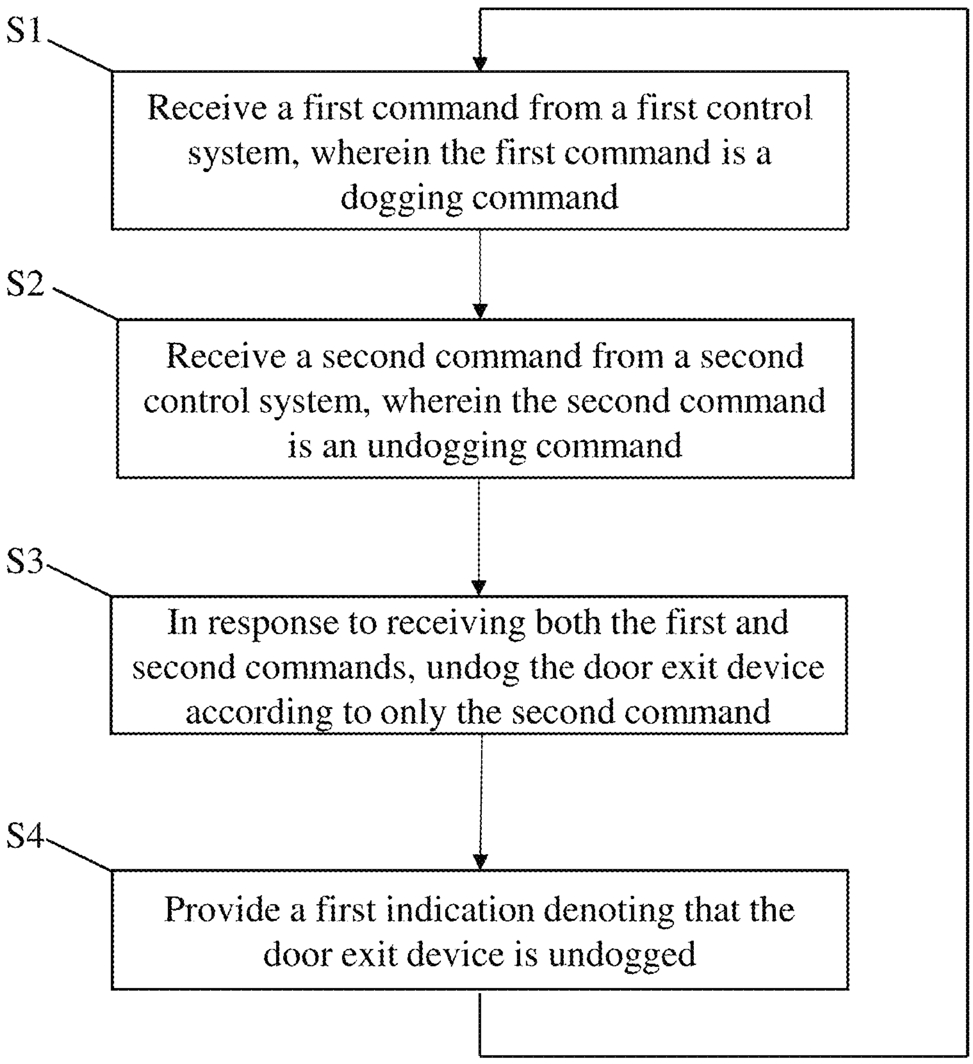
FIG. 4 is a flowchart showing a method of using an exit device having an indicator according to one illustrative embodiment.

The present disclosure may also be embodied as a method, for example, as shown in FIG. 4. Particularly, a processor (e.g., the processor of electronic dogging mechanism 116) may execute a series of steps to perform the function of indicating the status of exit device 100, particularly when there is a conflict between commands issued via switch 122 and user authentication module 112. Specifically, at step S1, the processor may receive a first command from a first control system (e.g., the control system defined by user authentication module 122) to place exit device 100 in a dogged state. Simultaneously or near in time to the first command, the processor associated with electronic dogging mechanism 116 may also receive a second command from a second control system (e.g., the control system associated with switch 122) to place exit device 100 in the undogged state. Detecting a conflict between the two control systems, the processor may then resolve the conflict in favor of the second control system at step S3 and place exit device 100 in the undogged state. At step S4, the processor may then communicate with light source 118 to direct light source 118 to project an appropriate indication (e.g., a third indication denoting that the processor has resolved a conflict between the two control systems in favor of the control system defined by switch 122).

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the processor may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A door exit device comprising:

a latch configured to move between an extended position and a retracted position;

an electronic dogging mechanism configured to selectively hold the latch in the retracted position when the dogging mechanism is in a dogged state and allow the latch to move between the retracted and extended positions when the dogging mechanism is in an undogged state;

a switch configured to transition the electronic dogging mechanism from the dogged state to the undogged state;

an indicator configured to provide a first indication denoting the dogged state and a second indication denoting the undogged state, wherein the indicator is disposed on the switch; and a user authentication module, wherein the user authentication module is configured to receive credentials from an authentication device, wherein the user authentication module is configured to transition the electronic dogging mechanism at least in part based on the credentials received from the authentication device, wherein the user authentication module is configured to transition the electronic dogging mechanism from the undogged state to the dogged state in response to the receipt of credentials from the authentication device, and wherein when the electronic dogging mechanism receives a command from the switch conflicting with a command from the user authentication module, the command from the switch supersedes the command from the user authentication module.

2. The door exit device of claim 1, further including a processor electrically connected to the user authentication module, the switch, and the electronic dogging mechanism.

3. The door exit device of claim 2, wherein the processor is configured to perform the steps of:

receiving a dogging command from the user authentication module; and transitioning the electronic dogging mechanism from the undogged state to the dogged state.

4. The door exit device of claim 2, wherein the processor is configured to perform the steps of:

receiving a dogging signal from the switch;

transitioning the electronic dogging mechanism from the undogged state to the dogged state;

receiving an undogging signal from the switch; and transitioning the electronic dogging mechanism from the dogged state to the undogged state.

5. A door exit device comprising:

a latch configured to move between an extended position and a retracted position;

an electronic dogging mechanism configured to selectively hold the latch in the retracted position when the dogging mechanism is in a dogged state and allow the latch to move between the retracted and extended positions when the dogging mechanism is in an undogged state;

an indicator providing a first indication denoting the dogged state and a second indication denoting the undogged state;

a switch configured to control the electronic dogging mechanism;

a user authentication module, wherein the user authentication module is disposed within the exit device and the user authentication module is configured to receive credentials from an authentication device;

wherein the user authentication module is configured to transition the electronic dogging mechanism at least in part based on the credentials received from the authentication device;

wherein the user authentication module is configured to transition the electronic dogging mechanism from the undogged state to the dogged state in response to the receipt of credentials from the authentication device; and wherein when the electronic dogging mechanism receives a command from the switch conflicting with a command from the user authentication module, the command from the switch supersedes the command from the user authentication module.

6. The door exit device of claim 5, wherein the switch is configured to transition the electronic dogging mechanism from the dogged state to the undogged state.

7. The door exit device of claim 5, wherein the switch is configured to transition the electronic dogging mechanism from the undogged state to the dogged state.

8. The door exit device of claim 5, wherein the light source is disposed within or formed with the switch.

9. The door exit device of claim 5, further including a processor electrically connected to the user authentication module, the switch, and the electronic dogging mechanism.

10. The door exit device of claim 9, wherein the processor is configured to perform the steps of:

receiving a dogging command from the user authentication module; and transitioning the electronic dogging mechanism from the undogged state to the dogged state.

11. The door exit device of claim 9, wherein the processor is configured to perform the steps of:

receiving a dogging signal from the switch;

transitioning the electronic dogging mechanism from the undogged state to the dogged state;

receiving an undogging signal from the switch; and transitioning the electronic dogging mechanism from the dogged state to the undogged state.

12. The door exit device of claim 5, further including a push bar configured to transition the latch between the extended and retracted positions.

13. The door exit device of claim 5, further comprising a power source configured to provide electrical power to the electronic dogging mechanism.

14. The door exit device of claim 5, wherein the first and second indications are visible from a distance of a distance of 50 ft or less.

15. The door exit device of claim 5, wherein the first and second indications are visible in the dark.

* * * * *